United States Patent
Karygianni et al.

(10) Patent No.: US 12,155,526 B1
(45) Date of Patent: Nov. 26, 2024

(54) DEPLOYING NETWORK ANOMALY DETECTION SYSTEMS BASED ON ENDPOINT CRITICALITY

(71) Applicant: Cisco Technology, Inc., San Jose, CA (US)

(72) Inventors: Sofia Karygianni, Dubendorf (CH); Andrea Di Pietro, Frejus (FR); Sukrit Dasgupta, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/196,705

(22) Filed: May 12, 2023

(51) Int. Cl.
  *G06F 15/173* (2006.01)
  *H04L 41/0681* (2022.01)
  *H04L 41/22* (2022.01)

(52) U.S. Cl.
  CPC .......... *H04L 41/0681* (2013.01); *H04L 41/22* (2013.01)

(58) Field of Classification Search
  None
  See application file for complete search history.

(56) References Cited

U.S. PATENT DOCUMENTS

| | | | |
|---|---|---|---|
| 10,148,686 B2 | 12/2018 | Hassanzadeh et al. | |
| 10,659,324 B2 | 5/2020 | Pang et al. | |
| 10,965,556 B2 | 3/2021 | Savalle et al. | |
| 11,121,947 B2 | 9/2021 | Narayan et al. | |
| 11,223,639 B2 | 1/2022 | Mandrychenko | |
| 11,258,673 B2 | 2/2022 | Vasseur et al. | |
| 11,451,456 B2 | 9/2022 | Tedaldi et al. | |
| 11,451,565 B2* | 9/2022 | Zhou | G06N 3/084 |
| 11,755,955 B2* | 9/2023 | Lange | G06F 11/3006 |
| | | | 702/186 |
| 2018/0219897 A1* | 8/2018 | Muddu | G06F 16/444 |
| 2020/0145440 A1* | 5/2020 | Mohan | H04L 63/1425 |
| 2021/0329029 A1 | 10/2021 | Vasseur et al. | |
| 2022/0014533 A1 | 1/2022 | Almaz et al. | |
| 2022/0172342 A1* | 6/2022 | Zepeda Salvatierra | |
| | | | G06V 30/19147 |
| 2023/0027149 A1* | 1/2023 | Kuan | H04L 63/1425 |
| 2023/0164156 A1* | 5/2023 | Grossman | F03D 17/00 |
| | | | 726/22 |
| 2023/0297057 A1* | 9/2023 | Lavrentyev | G05B 19/048 |
| | | | 700/79 |

* cited by examiner

*Primary Examiner* — Phuoc H Nguyen
(74) *Attorney, Agent, or Firm* — BEHMKE INNOVATION GROUP LLC; James M. Behmke; Keith O. Mitchell

(57) ABSTRACT

In one embodiment, a device determines a criticality of each of a plurality of endpoints in a network, based on network telemetry data regarding the network. The device translates a plurality of anomaly detection models available for deployment to the network and their metadata into a set of adjustable resources. The device generates an anomaly detection deployment strategy for the network by selecting a set of one or more of the plurality of anomaly detection models for deployment to one or more execution points in the network, based on the criticality of each of the plurality of endpoints and on the set of adjustable resources. The device causes the set to be deployed to the one or more execution points in the network, in accordance with the anomaly detection deployment strategy.

20 Claims, 5 Drawing Sheets

DEPLOYING NETWORK ANOMALY DETECTION SYSTEMS BASED ON ENDPOINT CRITICALITY

TECHNICAL FIELD

The present disclosure relates generally to computer networks, and, more particularly, to deploying network anomaly detection systems based on endpoint criticality.

BACKGROUND

Monitoring the behavior of endpoints in a network is especially important as it can allow for the early detection of attacks, misconfigurations, and others situations that compromise the correct functionality of the network. Fortunately, such anomalies can be detected by network anomaly detection systems that often employ behavioral, machine learning-based models that go beyond the declarative characteristics of devices and learn from their behavioral characteristics instead. For instance, an endpoint that is consistently inactive during the night suddenly sending a significantly high amount of traffic at night could indicate the presence of malware.

Typically, network anomaly detection systems treat all endpoints in a network as equivalent in terms of their importance of being monitored. However, it is often the case that each anomaly can have quite different consequences, depending on the location and the connectivity of the affected endpoint in the network. For instance, compromised door locks in critical lab facilities represents a much more serious security concern than compromised door locks in conference rooms. The same is true for devices connected close to aggregation switches when compared to devices connected to more remote access switches: the first ones have more visibility on North-South traffic of the network, while the later are only exposed to East-West traffic. In addition, since each endpoint is treated equally, alerts raised by lower priority endpoints may overshadow those from critical endpoints.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
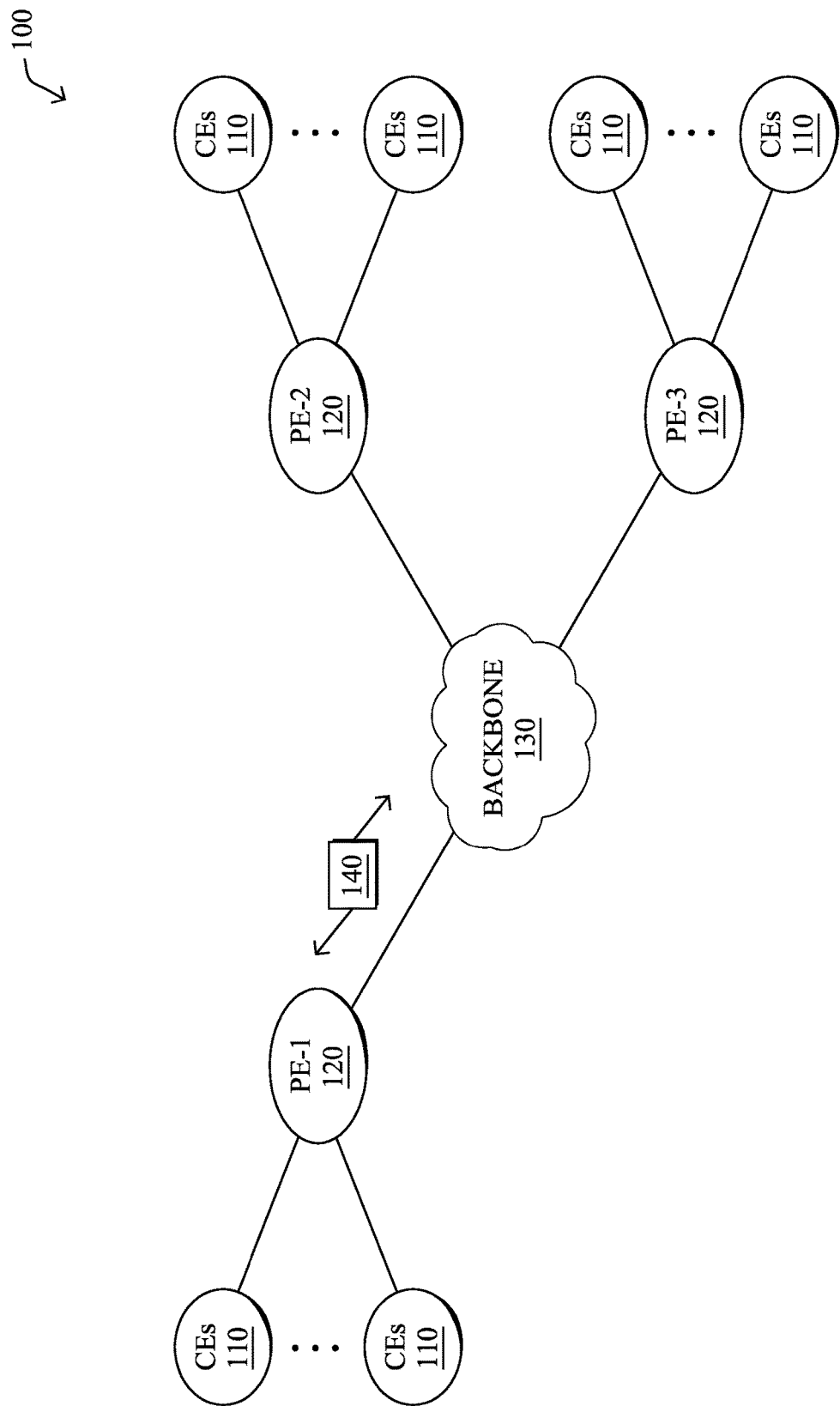
FIGS. 1A-1B illustrate an example communication network.

According to one or more embodiments of the disclosure, a device determines a criticality of each of a plurality of endpoints in a network, based on network telemetry data regarding the network. The device translates a plurality of anomaly detection models available for deployment to the network and their metadata into a set of adjustable resources. The device generates an anomaly detection deployment strategy for the network by selecting a set of one or more of the plurality of anomaly detection models for deployment to one or more execution points in the network, based on the criticality of each of the plurality of endpoints and on the set of adjustable resources. The device causes the set to be deployed to the one or more execution points in the network, in accordance with the anomaly detection deployment strategy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
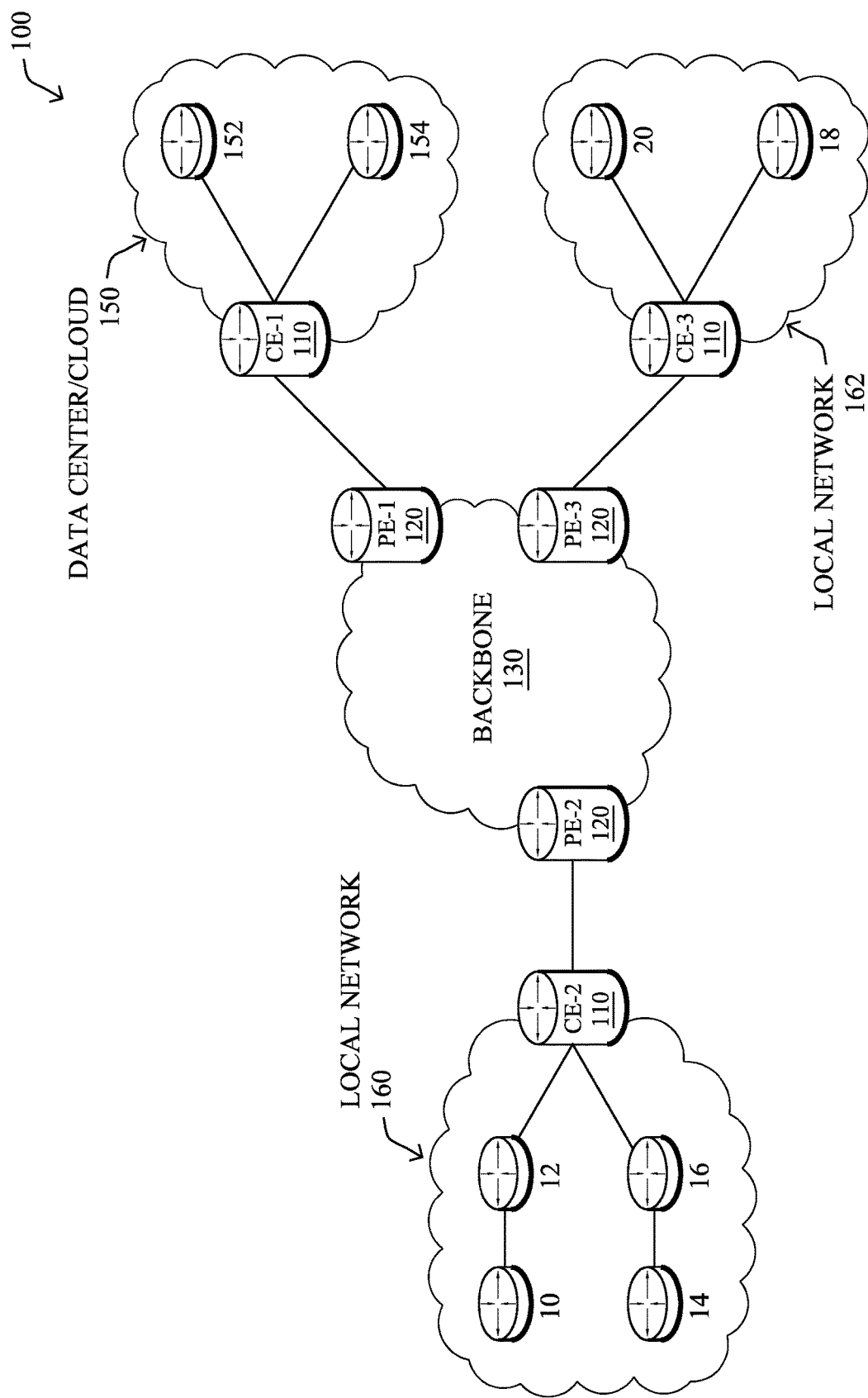

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include nodes/devices 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
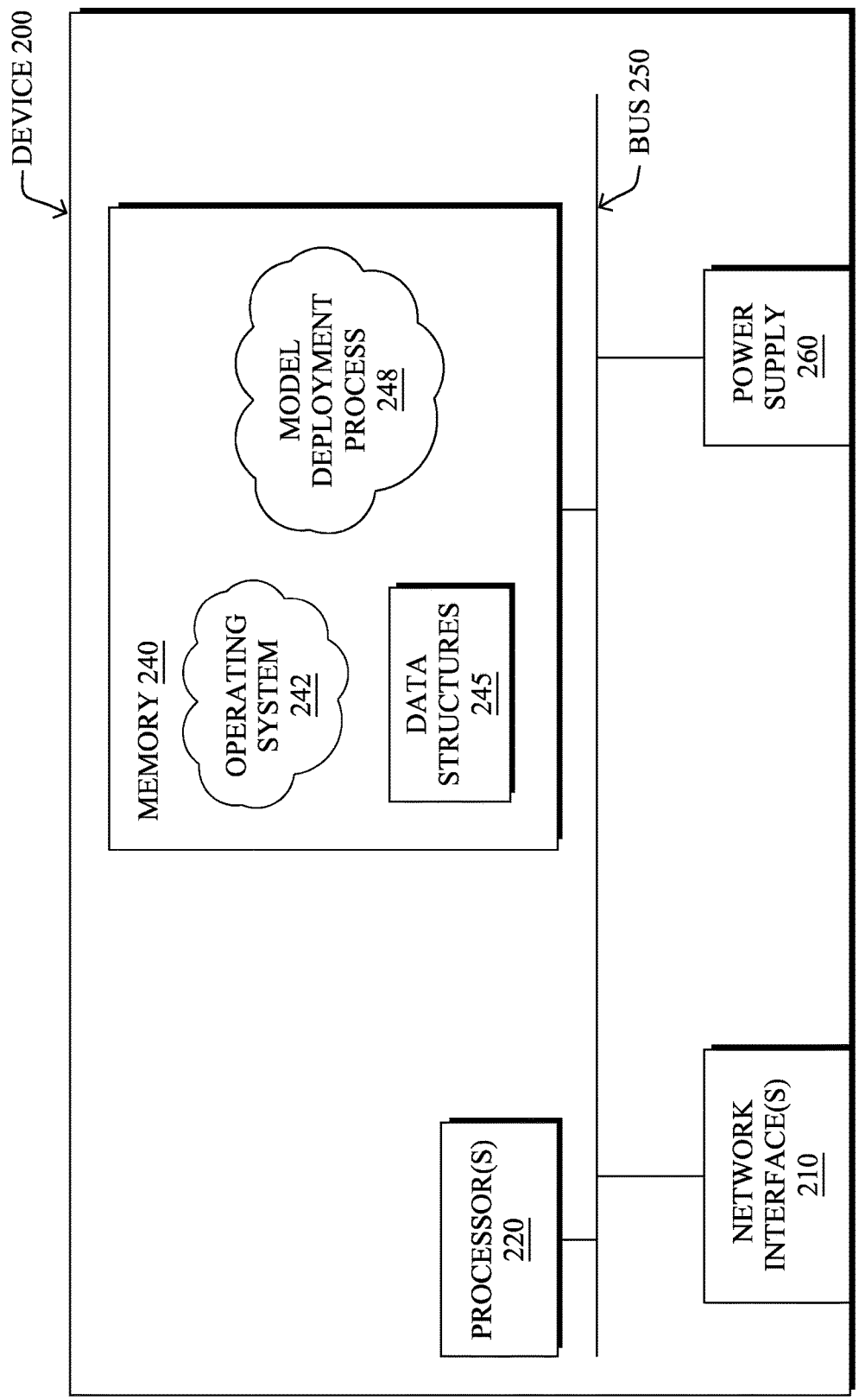
FIG. 2 illustrates an example network device/node.

FIG. 2 is a schematic block diagram of an example node/device 200 (i.e., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise model deployment process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Model deployment process 248 includes computer executable instructions that, when executed by processor(s) 220, cause device 200 to deploy anomaly detection functions to a network as part of an anomaly detection infrastructure within the network. In general, network anomaly detection attempts to identify patterns that do not conform to an expected behavior. For example, in one embodiment, the anomaly detection infrastructure of the network may be operable to detect network attacks (e.g., DDOS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging. 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DOS) such as DNS reflection, UDP flood, HTTP recursive get, etc. In the case of a (D)DoS, although technical an anomaly, the term "DoS" is usually used. To this end, model deployment process 248 may deploy models that detect malware based on the corresponding impact on traffic, and using host models, graph-based analysis, or the like, to detect when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted routing information base (RIB)/forwarding information base (FIB) or the presence of a persistent loop by a routing protocol hitting a corner case). Here, the model(s) deployed by model deployment process 248 may detect such misbehaviors by detecting behavioral changes in a device that differ from what is expected for that device.

Other dramatic behavioral changes: the introduction of a new networking or end-device configuration, or even the introduction of a new application may lead to dramatic behavioral changes. Although technically not anomalous, a model deployed by model deployment process 248 may still raise an anomaly when detecting a significant behavioral change in a device. Note that in such as case, although an anomaly may be raised, the anomaly detection infrastructure may still learn the new behavior and dynamically adapt to it, potentially also leveraging user feedback and/or by deploying new model(s) to the network, as well.

Misconfigured devices: As would be appreciated, a configuration change to a device may also trigger an anomaly. For instance, a misconfigured access control list (ACL), route redistribution policy, routing policy, QoS policy maps, or the like, may have dramatic consequences such a traffic black-hole, QoS degradation, etc. In some instances, models deployed by model deployment process 248 into the network may also identify these forms of misconfigurations, so that they can be detected and fixed.

In various embodiments, model deployment process 248 and/or the models that it deploys may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, the anomaly detection infrastructure may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

As noted above, network anomaly detection systems typically treat all endpoints in a network as equivalent in terms of their importance of being monitored. However, it is often the case that each anomaly can have quite different consequences, depending on the location and the connectivity of the affected endpoint in the network. For instance, compromised door locks in critical lab facilities represents a much more serious security concern than compromised door locks in conference rooms. The same is true for devices connected close to aggregation switches when compared to devices connected to more remote access switches: the first ones have more visibility on North-South traffic of the network, while the later are only exposed to East-West traffic. In addition, since each endpoint is treated equally, alerts raised by lower priority endpoints may overshadow those from critical endpoints.

Deploying Network Anomaly Detection Systems Based on Endpoint Criticality

The techniques herein allow for selectively deploying anomaly detection functions into a network, based on various criteria, such as the criticality of the endpoints. In some aspects, the techniques herein may also take explicit input from a user, to design a deployment strategy that tunes the anomaly detection models to the different criteria. Such criteria may take the form of user-specified parameters and/or automatically determined based on the characteristics of the network itself. This allows for the deployment of anomaly detection infrastructure that favors monitoring sensitive/critical portions of the network while taking a more conservative approach in less sensitive/critical portions of the network.

Illustratively, the techniques described herein may be performed by hardware, software, and/or firmware, such as in accordance with model deployment process 248, which may include computer executable instructions executed by the processor 220 (or independent processor of interfaces 210) to perform functions relating to the techniques described herein.

Specifically, according to various embodiments, a device determines a criticality of each of a plurality of endpoints in a network, based on network telemetry data regarding the network. The device translates a plurality of anomaly detection models available for deployment to the network and their metadata into a set of adjustable resources. The device generates an anomaly detection deployment strategy for the network by selecting a set of one or more of the plurality of anomaly detection models for deployment to one or more execution points in the network, based on the criticality of each of the plurality of endpoints and on the set of adjustable resources. The device causes the set to be deployed to the one or more execution points in the network, in accordance with the anomaly detection deployment strategy.

Figure 3:
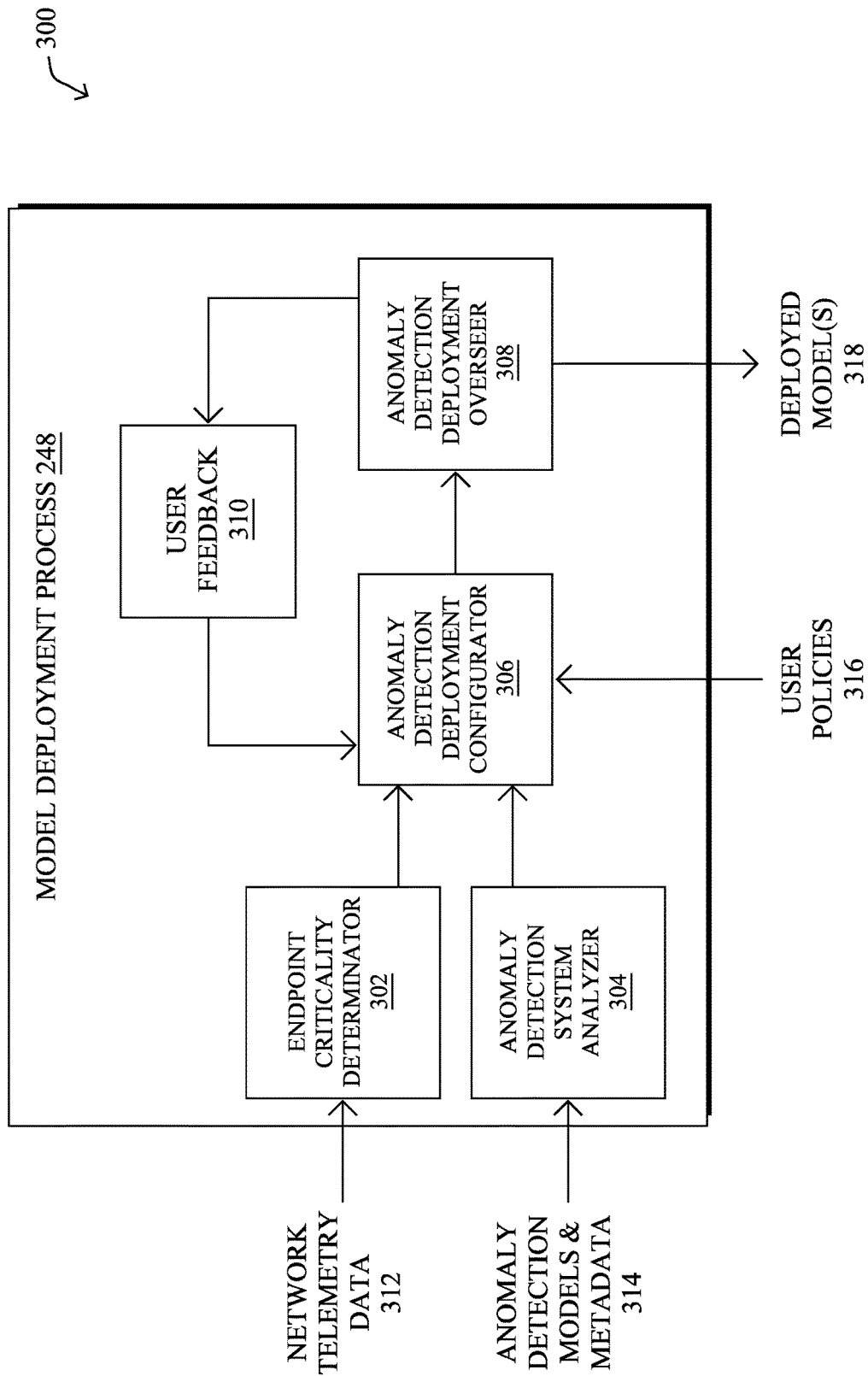
FIG. 3 illustrates an example architecture for deploying network anomaly detection systems based on endpoint criticality.

Operationally, FIG. 3 illustrates an example architecture 300 for deploying network anomaly detection systems based on endpoint criticality, according to various embodiments. As shown, at the core of architecture 300 is model deployment process 248, which may be executed by a specifically-configured device (i.e., device 200), either internally or externally to that of the network to which the anomaly detection infrastructure is to be deployed.

As shown, model deployment process 248 may include any or all of the following components: an endpoint criticality detector 302, an anomaly detection system analyzer 304, an anomaly detection deployment configurator 306, and/or an anomaly detection deployment overseer 308. As would be appreciated, the functionalities of these components may be combined or omitted, as desired. In addition, these components may be implemented on a singular device or in a distributed manner, in which case the combination of executing devices can be viewed as their own singular device for purposes of executing model deployment process 248.

The first component is the endpoint criticality detector 302, which is responsible for determining how critical each endpoint is for the network functionality based on how severe the consequences of anomaly of this endpoint would be.

To perform these tasks, endpoint criticality detector 302 may interact with a network controller and its components (such as Cisco DNA Center or other network controller), to acquire network telemetry data 312 like the endpoints in the network and their connectivity, the access privileges assigned to each endpoint etc. The criticality of each endpoint can then be inferred either fully automatically based on the telemetry data 312 (for example a server of a given type can be identified based on its traffic mix) or in a semi-supervised way where the user can input additional data.

For example, in one embodiment, the user could assist the procedure by providing information about the most/least critical endpoints or a set of conditions that should be met for endpoints in each importance level. In another embodiment, this process of assigning criticality could be a recommendation based on configurations and behavior obtained via crowdsourcing. In an embodiment, explicit user-interface based interaction may be facilitated for notification of automatically learnt criticality levels, or for explicit input gathering.

In various embodiments, anomaly detection system analyzer 304 may take as input the anomaly detection models and their metadata 314 and translate them into a set of adjustable resources. For example, the plurality of anomaly detection models may include a combination of Deep Neural Networks (DNNs) and logistic regression (LR) models for anomaly detection. Generally, DNNs require more space for storage and deployment while anomaly detection models that rely on logistic regression ones less resource-demanding. Thus, in some embodiments, anomaly detection system analyzer 304 may identify the memory and/or other resources needed for model storage, deployment, and/or execution as an adjustable resource. On the other hand, DNNs are typically more accurate with complex data than LR-based anomaly detectors, the model sensitivity could be another resource that anomaly detection system analyzer 304 identifies.

In various embodiments, anomaly detection deployment configurator 306 may take as input the criticality scores from endpoint criticality detector 302 and the adjustable resources identified by anomaly detection system analyzer 304, to design a deployment strategy for the anomaly detection system that maximizes the protection of the network, while minimizing the required resources. Following the previous example where there is a set of models taken as input by anomaly detection system analyzer 304 with different sensitivities, the optimal deployment strategy could mean assigning the less accurate LR models in the less critical endpoints and the more sophisticated DNNs in the most critical endpoints. In this way, even slight behavioral anomalies in the critical endpoints will raise alerts, while similar variations in the less critical areas of the network will not be prioritized unless they become very prominent. As a result, the anomaly detection infrastructure will offer visibility over the behavioral anomalies in the network with attention being focused on what matters the most.

In one embodiment, an administrator or other user could also specify a priori policies or user polices 316 that they want to impose on the anomaly system deployment. For instance, one such policy may specify that endpoints that are at the highest level of criticality should always get the most accurate models or have an exceptionally minimal risk of anomalies going undetected.

The output of anomaly detection deployment configurator 306 is the optimal anomaly detection deployment strategy, potentially also with statistics about the expected behavior of the system. Such statistics could be, for instance, the expected alerts per endpoint or per endpoint criticality level, the risk of anomalies going unnoticed per endpoint, or other such information that could be provided for display to a user.

In various embodiments, anomaly detection deployment overseer 308 is responsible for implementing the deployment strategy developed by anomaly detection deployment configurator 306 in the network. Anomaly detection deployment overseer 308 may also monitor the performance of the anomaly detection infrastructure, after deployment, as well. In some embodiments, anomaly detection deployment overseer 308 may further be an interactive component of model deployment process 248, allowing users to provide user feedback 310 via a user interface regarding the deployment and, if desired, make changes to it.

Each time a user requests a change, anomaly detection deployment overseer 308 may trigger anomaly detection deployment configurator 306 to provide a new proposal deployment strategy, as well as potentially any new corresponding statistics for that strategy. When the user approves the proposed plan, anomaly detection deployment overseer 308 may then deploy the anomaly detection model(s) 318 selected by anomaly detection deployment configurator 306 and according to its strategy (e.g., to the execution nodes in the network indicated by the strategy).

In turn, anomaly detection deployment overseer 308 may monitor the status of the system over time, as well. The administrator or other user can then leverage a user interface to interact with anomaly detection deployment overseer 308, to review the status of any endpoint/model of the network at any given time and get analytics regarding its behavior. Such analytics could, for instance, be the number of alerts per time windows, the type of alerts/threats per endpoint, etc. At any point, the user may also request additional changes in the deployment, an action that will trigger anomaly detection deployment configurator 306 to provide a new deployment strategy for implementation by anomaly detection deployment overseer 308. In this way, the human user is always in the loop, ensuring that the deployment can always adjust to the needs of the network operator.

Optionally, the user could also configure model deployment process 248 to automatically redeploy models based on different triggers. For instance, the user may configure anomaly detection deployment configurator 306 to automatically develop a new strategy that uses a less sensitive anomaly detection model, if the number of alerts raised by the current model at a given execution node in the network exceeds a certain threshold.

Figure 4:
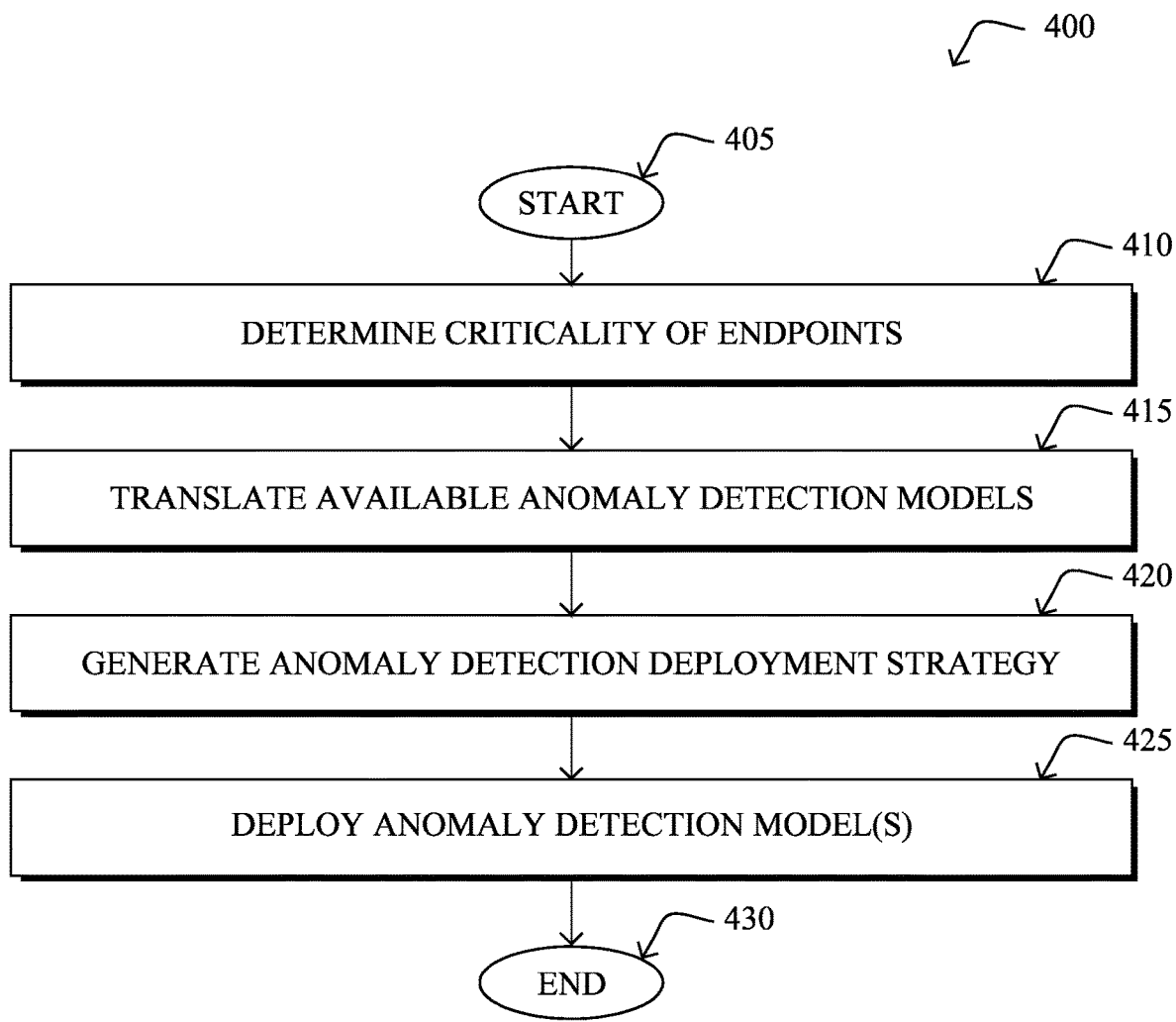
FIG. 4 illustrates an example simplified procedure for deploying network anomaly detection systems based on endpoint criticality.

FIG. 4 illustrates an example simplified procedure for deploying network anomaly detection systems based on endpoint criteria, in accordance with one or more embodiments described herein. For example, a non-generic, specifically configured device (e.g., device 200) may perform procedure 400 by executing stored instructions (e.g., process 248). The procedure 400 may start at step 405, and continues to step 410, where, as described in greater detail above, the device may determine, a criticality of each of a plurality of endpoints in a network, based on network telemetry data regarding the network. In an embodiment, the device may determine the criticality of each of the plurality of endpoints based in part on their types indicated by the network telemetry data. In another embodiment, the determining the criticality of each endpoint may comprise the following: (a) providing by the device an indication of the network telemetry data to a user interface, and receiving, from the user interface, an indication of the criticality of each endpoint. An embodiment may also include basing the criticality of each endpoint on crowd-sourced data. In another embodiment, the one or more execution points may comprise a router or switch in the network.

At step 415, as described in greater detail above, the device may a plurality of anomaly detection models available for deployment to the network and their metadata into a set of adjustable resources. In an embodiment, the anomaly detection models may comprise different types of modes, each having its own associated resource consumptions.

At step 420 the device may generate an anomaly detection deployment strategy for the network by selecting a set of one or more of the plurality of anomaly detection models for deployment to one or more execution points in the network, based on the criticality of each of the plurality of endpoints and on the set of adjustable resources, as described in greater detail above. In one embodiment, the device may generate the anomaly detection deployment strategy in accordance with a predefined policy that favors deploying an anomaly detection model with higher accuracy to an execution point in the network through which traffic that is associated with an endpoint with higher criticality is conveyed.

At step 425, the device may cause the set to be deployed to the one or more execution points in the network, in accordance with the anomaly detection deployment strategy, in accordance with the anomaly detection deployment strategy. For instance, the device itself may directly deploy the model(s) in the set to the network or instruct another device to do so. In another embodiment, the anomaly detection deployment strategy may be provided by the device to a user interface for review, prior to causing the set to be deployed to the one or more execution points in the network. In a further embodiment, the device may also provide to a user interface data regarding a particular one of the plurality of endpoints that was generated by a particular one of the anomaly detection models deployed to the network to monitor traffic associated with that endpoint. In another embodiment, the anomaly detection deployment strategy may further be adjusted based on the feedback from a user interface.

Procedure 400 then ends at step 430.

It should be noted that while certain steps within procedures 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400 are described separately, certain steps from each procedure may be incorporated into each other procedure, and the procedures are not meant to be mutually exclusive.

While there have been shown and described illustrative embodiments that provide for deploying network anomaly detection systems based on endpoint criticality, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a device, a criticality of each of a plurality of endpoints in a network, based on network telemetry data regarding the network, wherein the criticality of each of the plurality of endpoints corresponds to a severity of consequences an anomaly would have respectively on each of the plurality of endpoints as compared to other endpoints of the plurality of endpoints;

translating, by the device, a plurality of anomaly detection models available for deployment to the network and their metadata into a set of adjustable resources;

generating, by the device, an anomaly detection deployment strategy for the network by selecting a set of one or more of the plurality of anomaly detection models for deployment to one or more execution points in the network, based on the criticality of each of the plurality of endpoints and on the set of adjustable resources; and causing, by the device, the set to be deployed to the one or more execution points in the network, in accordance with the anomaly detection deployment strategy.

2. The method as in claim 1, wherein the device determines the criticality of each of the plurality of endpoints based in part on their types indicated by the network telemetry data.

3. The method as in claim 1, wherein determining the criticality of each endpoint comprises:
providing, by the device, an indication of the network telemetry data to a user interface; and
receiving, from the user interface, indications of the criticality of each endpoint.

4. The method as in claim 1, wherein the criticality of each endpoint is based further on crowd-sourced data.

5. The method as in claim 1, wherein the plurality of anomaly detection models comprises different types of models, each having its own associated resource consumptions.

6. The method as in claim 1, wherein the device generates the anomaly detection deployment strategy in accordance with a predefined policy that favors deploying an anomaly detection model with higher accuracy to an execution point in the network through which traffic that is associated with an endpoint with higher criticality is conveyed.

7. The method as in claim 1, further comprising:
providing, by the device, the anomaly detection deployment strategy to a user interface for review, prior to causing the set to be deployed to the one or more execution points in the network.

8. The method as in claim 1, further comprising:
providing, by the device and to a user interface, data regarding a particular one of the plurality of endpoints that was generated by a particular anomaly detector in the set deployed to the network to monitor traffic associated with that endpoint.

9. The method as in claim 1, further comprising:
adjusting the anomaly detection deployment strategy, based on feedback from a user interface.

10. The method as in claim 1, wherein the one or more execution points comprise a router or switch in the network.

11. An apparatus, comprising:
one or more network interfaces;
a processor coupled to the one or more network interfaces and configured to execute one or more processes; and
a memory configured to store a process that is executable by the processor, the process when executed configured to:
determine a criticality of each of a plurality of endpoints in a network, based on network telemetry data regarding the network, wherein the criticality of each of the plurality of endpoints corresponds to a severity of consequences an anomaly would have respectively on each of the plurality of endpoints as compared to other endpoints of the plurality of endpoints;
translate a plurality of anomaly detection models available for deployment to the network and their metadata into a set of adjustable resources;
generate an anomaly detection deployment strategy for the network by selecting a set of one or more of the plurality of anomaly detection models for deployment to one or more execution points in the network, based on the criticality of each of the plurality of endpoints and on the set of adjustable resources; and
cause the set to be deployed to the one or more execution points in the network, in accordance with the anomaly detection deployment strategy.

12. The apparatus as in claim 11, wherein the apparatus determines the criticality of each of the plurality of endpoints based in part on their types indicated by the network telemetry data.

13. The apparatus as in claim 11, wherein the apparatus determines the criticality of each endpoint by:
providing an indication of the network telemetry data to a user interface; and
receiving, from the user interface, indications of the criticality of each endpoint.

14. The apparatus as in claim 11, wherein the criticality of each endpoint is based further on crowd-sourced data.

15. The apparatus as in claim 11, wherein the plurality of anomaly detection models comprises different types of models, each having its own associated resource consumptions.

16. The apparatus as in claim 11, wherein the apparatus generates the anomaly detection deployment strategy in accordance with a predefined policy that favors deploying an anomaly detection model with higher accuracy to an execution point in the network through which traffic that is associated with an endpoint with higher criticality is conveyed.

17. The apparatus as in claim 11, wherein the process when executed is further configured to:
provide the anomaly detection deployment strategy to a user interface for review, prior to causing the set to be deployed to the one or more execution points in the network.

18. The apparatus as in claim 11, wherein the process when executed is further configured to:
provide, to a user interface, data regarding a particular one of the plurality of endpoints that was generated by a particular anomaly detector in the set deployed to the network to monitor traffic associated with that endpoint.

19. The apparatus as in claim 11, wherein the process when executed is further configured to:
adjusting the anomaly detection deployment strategy, based on feedback from a user interface.

20. A tangible, non-transitory, computer-readable medium storing program instructions that cause a device to execute a process comprising:
determining, by the device, a criticality of each of a plurality of endpoints in a network, based on network telemetry data regarding the network, wherein the criticality of each of the plurality of endpoints corresponds to a severity of consequences an anomaly would have respectively on each of the plurality of endpoints as compared to other endpoints of the plurality of endpoints;
translating, by the device, a plurality of anomaly detection models available for deployment to the network and their metadata into a set of adjustable resources;
generating, by the device, an anomaly detection deployment strategy for the network by selecting a set of one or more of the plurality of anomaly detection models for deployment to one or more execution points in the network, based on the criticality of each of the plurality of endpoints and on the set of adjustable resources; and causing, by the device, the set to be deployed to the one or more execution points in the network, in accordance with the anomaly detection deployment strategy.

* * * * *